US008761597B2

(12) United States Patent
Hinderthuer (10) Patent No.: US 8,761,597 B2
(45) Date of Patent: Jun. 24, 2014

(54) MONITORING NODE AND REFLECTOR NODE OF AN OPTICAL COMMUNICATION NETWORK, OPTICAL COMMUNICATION NETWORK, AND METHOD FOR OPERATING AN OPTICAL COMMUNICATION NETWORK

(75) Inventor: Henning Hinderthuer, Finning (DE)

(73) Assignee: ADVA AG Optical Networking (DE)

( * ) Notice: Subject to any disclaimer, the term of this patent is extended or adjusted under 35 U.S.C. 154(b) by 170 days.

(21) Appl. No.: 13/210,100

(22) Filed: Aug. 15, 2011

(65) Prior Publication Data

US 2012/0070146 A1 Mar. 22, 2012

(30) Foreign Application Priority Data

Sep. 17, 2010 (EP) .................................... 10009861

(51) Int. Cl.
*H04B 10/08* (2006.01)
*H04B 17/00* (2006.01)

(52) U.S. Cl.
USPC .................................... 398/20; 398/9; 398/17

(58) Field of Classification Search
USPC ................. 398/10, 13, 17, 20, 21, 9
See application file for complete search history.

(56) References Cited

U.S. PATENT DOCUMENTS

| 6,185,020 | B1* | 2/2001 | Horiuchi et al. ................ 398/31 |
| 2002/0168142 | A1 | 11/2002 | Copner et al. | |
| 2003/0072009 | A1* | 4/2003 | Domash et al. ............... 356/519 |
| 2005/0105902 | A1 | 5/2005 | Alavie et al. | |
| 2006/0098980 | A1 | 5/2006 | Lee et al. | |
| 2009/0174931 | A1* | 7/2009 | Huber et al. .................. 359/340 |
| 2009/0290874 | A1* | 11/2009 | Kaneko et al. .................. 398/65 |

FOREIGN PATENT DOCUMENTS

EP   1432149 A1   6/2004

OTHER PUBLICATIONS

Yeh C H et al., Fiber-Fault Monitoring Technique for Passive Optical Networks Based on Fiber Bragg Gratings and Semiconductor optical amplifier, Optics Communications, North-Holland Publishing Co., amsterdam, NL, vol. 257, No. 2, Jan. 15, 2006, pp. 306-310, XP025251817, ISSN: 0030-4018, DOI:10.1016/J.OPTCOM.2005. 07.042 retr eved on Jan. 15, 2006].*
Yeh C H et al., Fiber-Fault Monitoring Technique for Passive Optical Networks Based on Fiber Bragg Gratings and Semiconductor optical amplifier, Optics Communications, North-Holland Publishing Co., amsterdam, NL, vol. 257, No. 2, Jan. 15, 2006, pp. 306-310, XP025251817, ISSN: 0030-4018, DOI:I 0.1016/J.OPTCOM.2005. 07.042 retr eved on Jan. 1, 2006.*
Yeh C H et al., Fiber-Fault Monitoring Technique for Passive Optical Networks Based on Fiber Bragg Gratings and Semiconductor optical amplifier, Optics Communications, North-Holland Publishing Co., amsterdam, NL, vol. 257, No. 2, Jan. 15, 2006, pp. 306-310, XP025251817, ISSN: 0030-4018, DOI:10.1016/J.OPTCOM.2005. 07.042 [retrieved on Jan. 15, 2006].

* cited by examiner

*Primary Examiner* — Daniel Dobson
(74) *Attorney, Agent, or Firm* — Donald R. Boys; Central Coast Patent Agency, Inc.

(57) ABSTRACT

The invention refers to a optical communication network comprising a monitoring node having a port for outputting at least one optical signal that has a first wavelength range over an optical link of the network to a reflector node of the network. In order to allow for efficient monitoring the optical link it is suggested that the reflector node comprises a wavelength selective optical reflector connected to the link, the reflector being configured for generating a monitoring signal by reflecting a part of the optical signal back into the link, the monitoring signal having a second wavelength range that is a proper sub-range of the first wavelength range and the monitoring node comprises a detector coupled with the port for determining whether the link is defective arranged for detecting the monitoring signal generated by the reflector node.

6 Claims, 6 Drawing Sheets

MONITORING NODE AND REFLECTOR NODE OF AN OPTICAL COMMUNICATION NETWORK, OPTICAL COMMUNICATION NETWORK, AND METHOD FOR OPERATING AN OPTICAL COMMUNICATION NETWORK

CROSS-REFERENCE TO RELATED DOCUMENTS

The present application claims priority to EP application 10 009 861.5, filed Sep. 17, 2010, which is incorporated herein in its entirety, at least by reference.

FIELD OF THE INVENTION

The present invention refers to a monitoring node of an optical communication network, a reflector node of an optical communication network, and an optical communication network comprising a monitoring node and a reflector node.

BACKGROUND

It is known to monitor an optical link such as an optical fiber of a communication network for failures like damage of the link or a break within the link. To this end, a monitoring node may send an optical signal through the optical link to the reflector node. The reflector node may reflect the signal back through the optical link to the monitoring node. If the monitoring node detects the reflected signal then it determines that the optical link is working correctly, i.e., is not defective. The wavelength of light reflected by the known reflector node is different from a wavelength used for an optical data signal carrying data to be transmitted between the nodes of the optical network.

When using the known monitoring node, reflector node or optical communication network, optical transmission resources between the monitoring node and the reflector node must be provided that are dedicated for monitoring the optical link.

SUMMARY

The object of the present invention is to provide a monitoring node of an optical communication network, a reflector node of an optical communication network, and an optical communication network that allow for efficiently monitoring an optical link of the network.

According to one aspect, the present invention provides a monitoring node of an optical communication network, the monitoring node comprising a port for outputting at least one optical signal having a first wavelength range over an optical link of the network to a reflector node of the network and a detector coupled with the port for determining whether the link is defective, wherein the detector is arranged for detecting a monitoring signal generated by the reflector node by reflecting a part of the optical signal back into the link, the monitoring signal having a second wavelength range that is proper a sub-range of the first wavelength range. In other words, the second wave-length range is a sub-range of the first wavelength range and the first wavelength range is greater than the second wavelength range. The first wavelength range overlaps the second wavelength range in the wavelength domain.

Because the second wavelength range is a proper sub-range of the first wavelength range the monitoring signal reflected back by the reflector node occupies transmission resources of the optical link, i.e., a wavelength range, that are already used for transmitting the optical signal. Therefore, when implementing a monitoring node according to the present invention, no additional transmission resources are required for monitoring the optical link arranged between the monitoring node and the reflector node. The detector being arranged for detecting the monitoring signal is sensitive to electromagnetic radiation within the second wavelength range. If this radiation, i.e., the monitoring signal, is present at the monitoring node then the detector determines that the link is working. If the detector fails to detect the monitoring signal then it determines that the optical link is defective.

In an embodiment, the first wavelength range is a bandwidth of an optical signal used for data transmission between nodes of an optical network over the optical link to be monitored. The second wavelength is a comparatively small section of that wavelength range.

In an embodiment, the monitoring node comprises a monitoring receiver for determining an amplitude of a filtered signal at an input of the monitoring receiver, a tunable filter arranged between the input of the monitoring receiver and the port, and a control element preferably coupled with the filter and the receiver, said control element being arranged for varying a pass wavelength of the filter while determining the amplitude of the filtered signal and for detecting that the monitoring signal is present if the determined amplitude varies according to the variation of the center frequency. This allows for reliably detect the monitoring signal even if the optical link induces backscatter radiation by reflecting the optical signal back to the monitoring node.

A spectrum of the backscatter corresponds essentially to a spectrum of the optical signal, i.e., the first wavelength range. However, the spectrum of the monitoring signal is only a part of the spectrum of the optical signal, i.e., the second wavelength range. If the monitoring signal is present in the link then the amplitude of the filtered signal is comparatively high if the pass wavelength corresponds at least essentially to the second wavelength range. If the pass wavelength and the second wavelength range are different from each other then the amplitude of the filtered signal is comparatively low.

Periodically varying the pass wavelength of the filter, i.e., wobbling the pass frequency, leads to a periodic variation of the amplitude of the filtered signal, which can be easily detected. If the monitoring signal is not present at the monitoring node, e.g., because of a link failure, then the monitoring nodes sees the backscatter of the optical signal only or no signal at all. When varying the pass frequency, the amplitude of the filtered signal remains at least essentially constant and does not vary according the variation of the center frequency. If no variations of the amplitude can be detected than the detector determines that the monitoring signal is not present and the link is defective.

Preferably, the tunable filter is a band-pass filter, preferably a tunable optical grating, said pass wavelength corresponding to a center wavelength of the band-pass filter.

Alternatively, in another embodiment the tunable filter is an optical periodic filter comprising a tunable optical resonator, preferably a tunable etalon, said pass wavelength corresponding to a center wavelength of a transmission peak of the resonator. An etalon is usually also referred to as "Fabry-Pérot interferometer". A periodic filter has multiple transmission peaks that are arranged periodically in the frequency (or wavelength) domain of a transfer function of the periodic filter.

The distance between adjacent center wavelengths may correspond to a carrier spacing of optical carriers used in an wavelength division multiplex (WDM) network or transmission line, each carrier corresponding to a single wavelength channel of the WDM network. When dimensioning the periodic filter in this way, the periodic filter needs not to be adapted to different optical channels, i.e., different first wavelength ranges, used by a transmitter for transmitting the optical signal. Whatever optical channel this transmitter uses for a transmitting the optical signal there is always a transmission peak the wavelength of which is within the first wavelength range of this optical channel. If the monitoring signal is present then varying the wavelength of the transmission peaks leads to a variation of the amplitude of the filtered signal.

According to another embodiment the monitoring node comprises a transmitter for transmitting the optical signal, said transmitter being arranged for varying a carrier frequency of an optical carrier of the optical signal and the monitoring node comprises a monitoring receiver for determining an amplitude of a signal received at an input of the monitoring receiver and a control element preferably coupled with the transmitter and the monitoring receiver said control element being arranged for varying the carrier frequency while determining the amplitude of said received signal and for detecting that the monitoring signal is present if the determined amplitude varies according to the variation of the carrier frequency. If the optical link is not defective then the amplitude of the signal arriving at the detector is comparatively high if the carrier frequency corresponds at least essentially to the second wave length range. Otherwise the amplitude is comparatively low. Therefore, periodically varying the carrier frequency leads to a corresponding periodic variation of the amplitude of the signal arriving at the detector if and only if the optical link is not defective.

The transmitter of the monitoring node may comprise a tunable light source, preferably a tunable laser, that is coupled with the control element such that the control element can vary the carrier frequency of the optical signal.

In both above-mentioned embodiments, a characteristic frequency of an optical component of the monitoring node is varied—either the pass wavelength of the filter or the carrier frequency—so that the amplitude at the detector varies according to the variation of the frequency if the monitoring signal is present. This allows for detecting the monitoring signal by analyzing changes of an amplitude of an optical signal arriving at the detector. The spectrum of the signal needs not to be analyzed. Thus, a monitoring node according these embodiments can be easily and cost efficiently implemented.

Preferably, the detector comprises an oscillator for varying the pass frequency or the carrier frequency and a lock-in amplifier for detecting the monitoring signal, a reference signal input of the lock-in amplifier being connected to an output of the oscillator. When using the lock-in amplifier, the monitoring signal can reliably detected even if the monitoring signal has a comparatively low power and/or if there is a great amount of backscatter caused by the optical link.

In an embodiment, the monitoring receiver comprises a photodiode, preferably a PIN photodiode. This allows to implement a simple detector for determining the amplitude of the signal arriving at the photodiode.

According to another aspect, the invention provides a reflector node of an optical communication network, said reflector node comprising a port for inputting an optical signal sent by a monitoring node of the network over an optical link to the reflector node, the optical signal having a first wavelength range, wherein the reflector node comprises a wavelength selective optical reflector configured for generating a monitoring signal by reflecting a part of the optical signal back into the link, the monitoring signal having a second wavelength range that is a proper sub-range of the first wavelength range.

In an embodiment, the reflector comprises a Bragg grating, a Bragg wavelength of which corresponding at least essentially to a center wavelength of the second wavelength range. Consequently, the first and the second wavelength range have the same center frequency. However the second wavelength range is narrower than the first wavelength range.

In another embodiment, the reflector comprises a periodic filter for reflecting multiple second wavelength ranges, preferably arranged equally spaced in the wavelength domain. A reflector node comprising the periodic filter can be used in a WDM network without the need to adapt the reflector and/or the periodic filter element to a specific optical channel occupied by the optical signal sent by the transmitter of the monitoring node.

In an embodiment, the periodic filter element is a etalon, a wavelength of a transmission minimum of which corresponding at least essentially to a center wavelength of the second wavelength range.

According to yet another aspect, the invention provides an optical communication network comprising a monitoring node having a port for outputting at least one optical signal that has a first wavelength range over an optical link of the network to a reflector node of the network, wherein the reflector node comprises a wavelength selective optical reflector configured for generating a monitoring signal by reflecting a part of the optical signal back into the link, the monitoring signal having a second wavelength range that is a proper sub-range of the first wavelength range and wherein the monitoring node comprises a detector coupled with the port for determining whether the link is defective arranged for detecting the monitoring signal generated by the reflector node.

In a preferred embodiment, the monitoring node is a monitoring node according to the embodiments of the present invention described above. In an embodiment, the reflector node is a reflector node according to the embodiment of the invention described above.

An optical communication network according to an embodiment comprises a monitoring node having a port for outputting at least one optical signal that has a first wavelength range over an optical link of the network to a reflector node of the network, wherein the monitoring node is a monitoring node according to one of claims 1 to 7 and/or the reflector node is a reflector node according to one of claims 8 to 11.

In a preferred embodiment, the network is an optical access network, preferably a passive optical access network, the monitoring node is a optical line termination (OLT) of the access network and the reflector node is an optical network unit (ONU) of the access network.

According to yet another aspect, the invention provides a method for operating an optical communication network, the method comprising: outputting at least one optical signal that has a first wavelength range via a port of a monitoring node over an optical link of the network to a reflector node of the network and generating a monitoring signal by reflecting a part of the optical signal back into the link, wherein generating the monitoring signal comprises reflecting the part of the optical signal by means of a wavelength selective optical reflector of the reflector node, the monitoring signal having a second wavelength range that is a proper sub-range of the first wavelength range, and the method comprises determining whether the link is defective by detecting the monitoring signal (m) generated by the reflector node by means of a detector coupled with the port.

BRIEF DESCRIPTION OF THE FIGURES

Preferred embodiments and further advantages of the present invention are shown in the Figures and described in detail hereinafter.

DESCRIPTION OF THE EMBODIMENTS

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Figure 1:
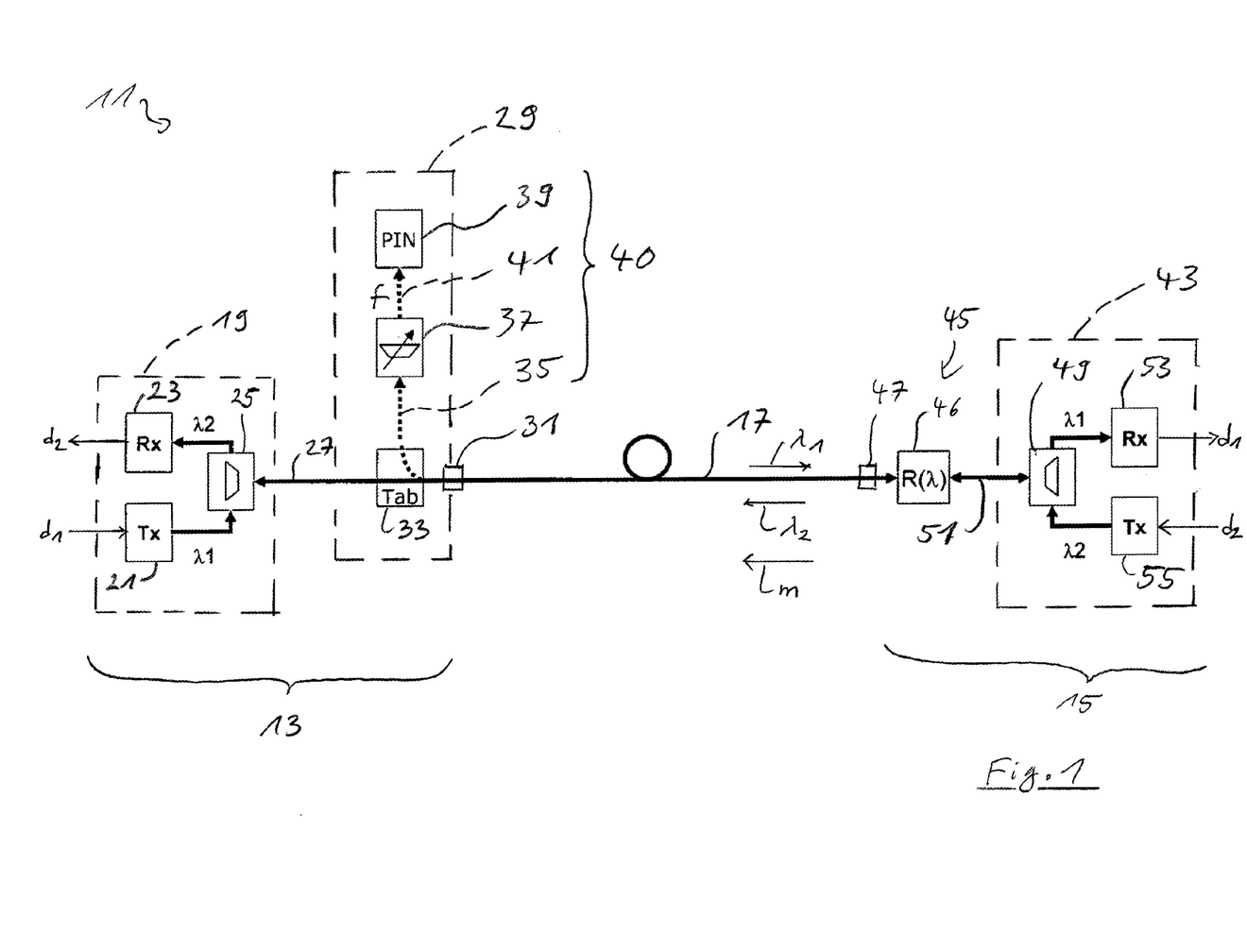
FIG. 1 shows an optical communication network according to a first preferred embodiment.

An optical communication network 11 shown in FIG. 1 comprises a monitoring node 13 and a reflector node 15. The monitoring node 13 and the reflector node 15 are connected to each other by means of an optical link 17 in the form of an optical fiber. In the shown embodiment, the network 11 is a wavelength division multiplex (WDM) passive optical network (WDM-PON). However, the present invention is not limited to WDM-PONS; the present invention can also be applied in connection with different types of optical networks. The monitoring node 13 may be an optical line termination (OLT) connecting the optical network 11 to a further network such as a wide area network like the Internet or the telephone network. The reflector node 15 may be an optical network unit (ONU), which may be located near to a customer of data or telecommunication services, i.e. in an apartment (fiber to the home, FTTH), in a building of the customer (fiber to the building, FTTB), or somewhere nearby the building of the customer (fiber to the curb, FTTC). The optical network unit may connect a customer's network or a customer's terminal to the optical network 11.

For the sake of simplicity the link 17 shown in FIG. 1 comprises a single optical fiber only. However, in different embodiments the link 17 may comprise passive optical components such as a passive remote node (RN) that may comprise optical components such as multiplexer-demultiplexers and/or optical couplers. A remote node may function as a concentrator for connecting multiple reflector nodes 15 to a single optical link connected to the monitoring node 13.

The monitoring node 13 comprises a first transceiver 19 having a first transmitter 21 arranged for transmitting a first optical signal $\lambda 1$ and a first receiver 23 arranged for receiving a second optical signal $\lambda 2$. The first transmitter 21 and the first receiver 23 are connected to a first duplexer 25. The first duplexer 25 is connected to a first end of a first internal link 27. A second end of the first internal link 27 is connected to a monitoring arrangement 29 of the monitoring node 13. The monitoring arrangement 29 is arranged between the second end of the first internal link 27 and a first end of the optical link 17. In an embodiment, the monitoring arrangement 29 of the monitoring node 13 may comprise a first port 31 such as a first connector to which the first end of the link 17 is connected.

The optical link 17 and the first internal link 27 are connected to each other by means of an optical coupler 33, which is also connected via a second internal link 35 to a tunable optical filter 37. The tunable filter 37 may comprise a mechanically adjustable optical grating, adjusting the grating leading to a change of a pass frequency of the optical filter 37. In other words, the optical filter 37 is a tunable optical bandpass filter.

The monitoring arrangement 29 further comprises a monitoring receiver 39 connected to an output of the optical filter 37 by means of a third internal link 41. The monitoring receiver 39 comprises a light sensitive element such as a photodiode or a PIN photodiode (PIN).

The tunable filter 37, the monitoring receiver 39, and the internal links 35, 41 are part of a detector 40 for detecting a monitoring signal m. The detector 40 is coupled to the first port 31 and the link 17 by means of the coupler 33.

The reflector node 15 comprises a second transceiver 43 and a reflector 45 having a wavelength selective grating 46 such as a Bragg grating. The reflector 45 is arranged between a second end of the optical link 17 and the second transceiver 43. The reflector node 15 may comprise a second port 47 such as a second connector for connecting the second end of the optical link 17 to the reflector 45. The reflector 45 and a second duplexer 49 of the second transceiver 43 are connected to each other by means of a fourth internal link 51. The second duplexer 49 is connected to a second receiver 53 of the second transceiver 43 arranged for receiving the first optical signal $\lambda 1$ and to a second transmitter 55 of the second transceiver 43 arranged for transmitting the second optical signal $\lambda 2$.

In the shown embodiment, the monitoring node 13 comprises besides the monitoring arrangement 29 the first transceiver 19 and the reflector node 15 comprises besides the reflector 45 the second transceiver 43. However, in another embodiment the first transceiver 19 is not a part of the monitoring node 13 and/or the second transceiver 43 is not a part of the reflector node 15. When applying this embodiment to a WDM-PON, the monitoring node 13 comprising the monitoring arrangement 29 only is a different device than e.g. a optical line termination (OLT) comprising the first transceiver 19. Accordingly, the reflector node 15 comprising the reflector 45 is a different device than e.g. a optical network unit (ONU) comprising the second receiver 43. Consequently, existing components of an optical network 11 can be upgraded by adding a monitoring node 14 comprising the monitoring arrangement 29 and a reflector node 15 comprising the reflector 45.

When operating the optical network 11 the first transmitter 21 generates the optical signal $\lambda 1$. The first duplexer 25 lets pass the first optical signal $\lambda 1$ to the first internal link 27. The first optical signal $\lambda 1$ then goes through the coupler 33, the first port 31, the optical link 17, the second port 47, the reflector 45, the fourth internal link 51, the second duplexer 49, and arrives at the second receiver 53. Accordingly, the second transmitter 55 generates the second optical signal $\lambda 2$.

The second optical signal λ2 goes through the second duplexer 49, the fourth internal link 51, the reflector 45, the second port 47, the optical link 17, the first port 31, the coupler 33, the first internal link 27, the first duplexer 25, and arrives at the first receiver 23.

The first transmitter 21 modulates the first optical signal with a first data stream $d_1$. The second receiver 53 demodulates the first optical signal and regenerates the first data stream $d_1$. Correspondingly, the second transmitter 55 modulates the second optical signal λ2 with a second data stream $d_2$ and the first receiver 23 demodulates the second optical signal λ2 and regenerates the second data stream $d_2$.

The reflector 45 lets pass through most of the power of the first optical signal λ1 to the second duplexer 49. However, the reflector 45 reflects a small portion of the power of the first optical signal λ1 back to the optical link 17. This reflected portion of the first optical signal λ1 corresponds to the monitoring signal m.

The coupler 33 passes a part of the power of optical radiation (e.g., monitoring signal, backscatter of the first optical signal λ1, second optical signal λ2) arriving at the monitoring node 13 via the second internal link 35 to an input of the tunable filter 37. The coupler 33 passes the remaining part of the power of this radiation via the first internal link 27 to the first transceiver 19. The tunable filter 37 filters the signals received from the optical link 17 and outputs a filtered signal f to the monitoring receiver via the third internal link 41. The monitoring receiver 49 receives the filtered signal f and determines a momentary amplitude A of the filtered signal f.

Figure 2:
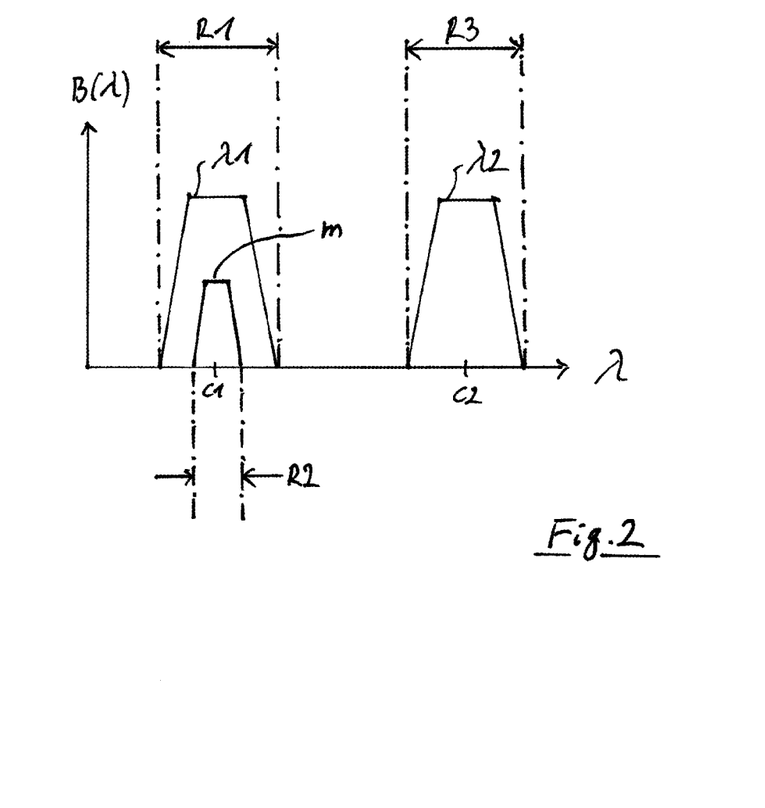
FIG. 2 shows a diagram of a spectrum of optical signals.

FIG. 2 shows transmission resources, i.e., wavelength ranges, occupied by the optical signals λ1 and λ2 as well as the monitoring signal m. The X-axis of the diagram shown in FIG. 2 corresponds to a wavelength of electromagnetic radiation, in particular light, transmitted over the optical link 17. The Y-axis shows a wavelength dependent amplitude B(λ) of the radiation. The first optical signal λ1 going from the monitoring node 13 to the reflector node 15 has a first wavelength range R1. A center wavelength c1 of the first wavelength range R1 corresponds to the wavelength c1 of an optical carrier generated by the first transmitter 21.

As shown in FIG. 2, the monitoring signal m reflected back by the reflector 45 has a smaller wavelength range R2 because the reflector 45 is wavelength selective and reflects merely a the part of the first signal λ1 that resides within the second wavelength range R2. Moreover, the second wavelength range R2 resides completely within the first wavelength range R1. In other words, the second wavelength range R2 is a proper sub-range of the first wavelength range R1. A bandwidth of the monitoring signal m is less than a bandwidth of the first optical signal λ1. As a consequence, the monitoring signal uses the same transmission resources like the first optical signal λ1 and no additional transmission resources are required for transmitting the monitoring signal m.

In the shown embodiment, the amplitude B(λ) of the monitoring signal m is less than the amplitude B(λ) of the first optical signal λ1 for all values of the wavelength within the first wavelength range R1. I. e, the part of the first optical signal λ1 belonging to the second wavelength range R2 is not reflected but passed to the second transceiver 43. However, in another embodiment the amplitude B(λ) of the monitoring signal may at least almost equal to the amplitude of the first optical signal λ1 at least for some values of the wavelength λ.

The second optical signal λ2 has a third wavelength range R3 that is disjunctive from the first wavelength range R1 and therefore also disjunctive from the second wavelength range R2. A center wavelength c2 of the third wavelength range R3 corresponds to the wavelength c2 of an optical carrier generated by the second transmitter 55. The first wavelength range R1 and the second wavelength range R2 do not overlap each other. Thus, the communication network 11 performs wavelength division duplex.

The carrier frequencies c1 and c2 of the optical signals λ1 and λ2 may correspond to wavelengths specified by a frequency grid of a WDM system. For example, a frequently grid specified by ITU-T may be applied. For example, coarse wavelength division multiplexing (CWDM) may be applied. According ITU-T Recommendation G.694.2 the first wavelength range R1 and/or the third wavelength range R3 may comprise several nm, preferably at most 6 to 7 nm. The optical carrier c1 of the first optical signal λ1 may be 1551 nm, for example. However, different optical carriers may be applied.

The present invention is not limited to CWDM. It can also be applied in connection with dense wavelength division multiplexing (DWDM). Frequency grids for DWDM are specified in ITU-T Recommendation G.694.1.

Although the reflector 45 outputs essentially only the monitoring signal m having the second wavelength range R2 the radiation arriving at the monitoring node 13 comprises additional portions within the first wavelength range R1 originating from backscattering effects of the optical link 17. Thus, the monitoring arrangement 29 needs to differentiate between the backscatter within the first frequency range R1 and the monitoring signal m.

Figure 3:
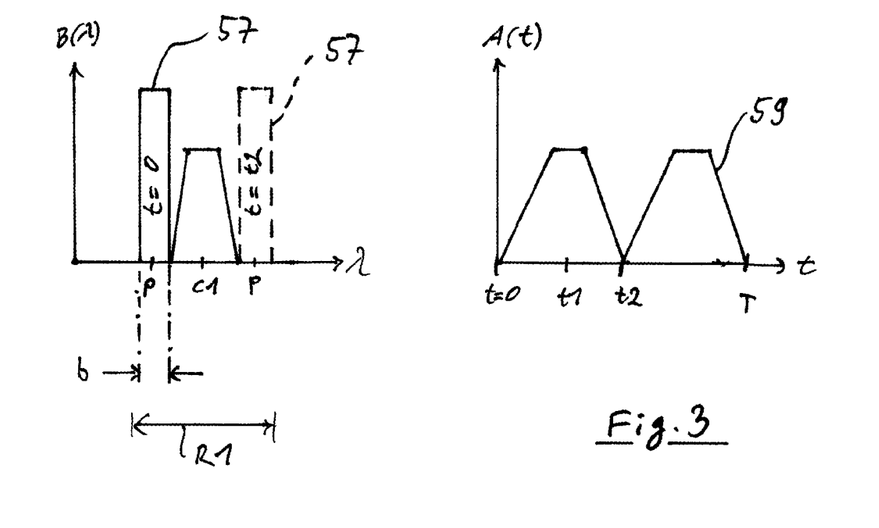
FIG. 3 shows diagrams of amplitude variations of a filtered signal received by a monitoring receiver of a monitoring node of the network shown in FIG. 1.

To this end, a pass wavelength p of the band-pass-filter 37 is continuously varied. Preferably, the filter 37 is periodically tuned in a way that a pass band 57 of the band-pass-filter 37 is continuously shifted over the first wavelength range R1. As can be seen in FIG. 3, a bandwidth b of the pass band 57 is less than the first wavelength range R1. Preferably, the bandwidth b of the pass band 57 is less or equal to the second wavelength range R2.

The diagram on the left hand side of FIG. 3 shows the pass band 57 of the band-pass-filter 37 at an instance t=0 and the spectral composition of the monitoring signal m. The diagram on the right hand side of FIG. 3 shows the momentary amplitude A of the signal f received by the monitoring receiver 39. At the instance t=0 the amplitude A of the received signal f is comparatively low because the pass band 57 does not overlap the monitoring signal m in the wavelength domain. However, when periodically and continuously shifting the pass band 57 within the first wavelength range R1 then the amplitude A of the received signal f varies in time. For example at instance t1 the amplitude A of the signal f is maximal because the pass band 57 completely overlaps the monitoring signal m. At an instance t2 the pass band 57 is completely above the monitoring signal m and therefore does not overlap the monitoring signal m anymore, as shown with dashed lines in the diagram on the left hand side of FIG. 3. As a consequence, at t=t2 the amplitude A of the signal f received by the monitoring receiver 39 has decreased again. When moving the pass band 57 back to the original position in the wavelength domain (as in t=0), the amplitude A of the signal f shows the same changes again. At an instance t=T the pass band 57 has reached its original position (for t=0) again.

When periodically moving the pass band 57 over the first wavelength range R1 the amplitude of the signal f received by the monitoring receiver 39 has a shape as shown by the curve 59 if and only if the monitoring signal m is present at the monitoring node, in particular at the first port 31 of the monitoring node 13. If the monitoring signal m is not present than the amplitude of the signal f does not vary when moving the pass band 57. The monitoring node 13 detects the monitoring signal m by verifying whether the amplitude A of the signal f received at the monitoring receiver 39 varies when varying the pass band 57. If the variations of the amplitude of the signal f are detected then the monitoring node 13 determines that the monitoring signal m is present and the optical link 17 is working, i.e., not defective. If the monitoring node 13 does not detect the variations of the amplitude A of the signal f then the monitoring node 13 determines that the monitoring signal m is not present and the optical link 17 is defective or disconnected.

Figure 4:
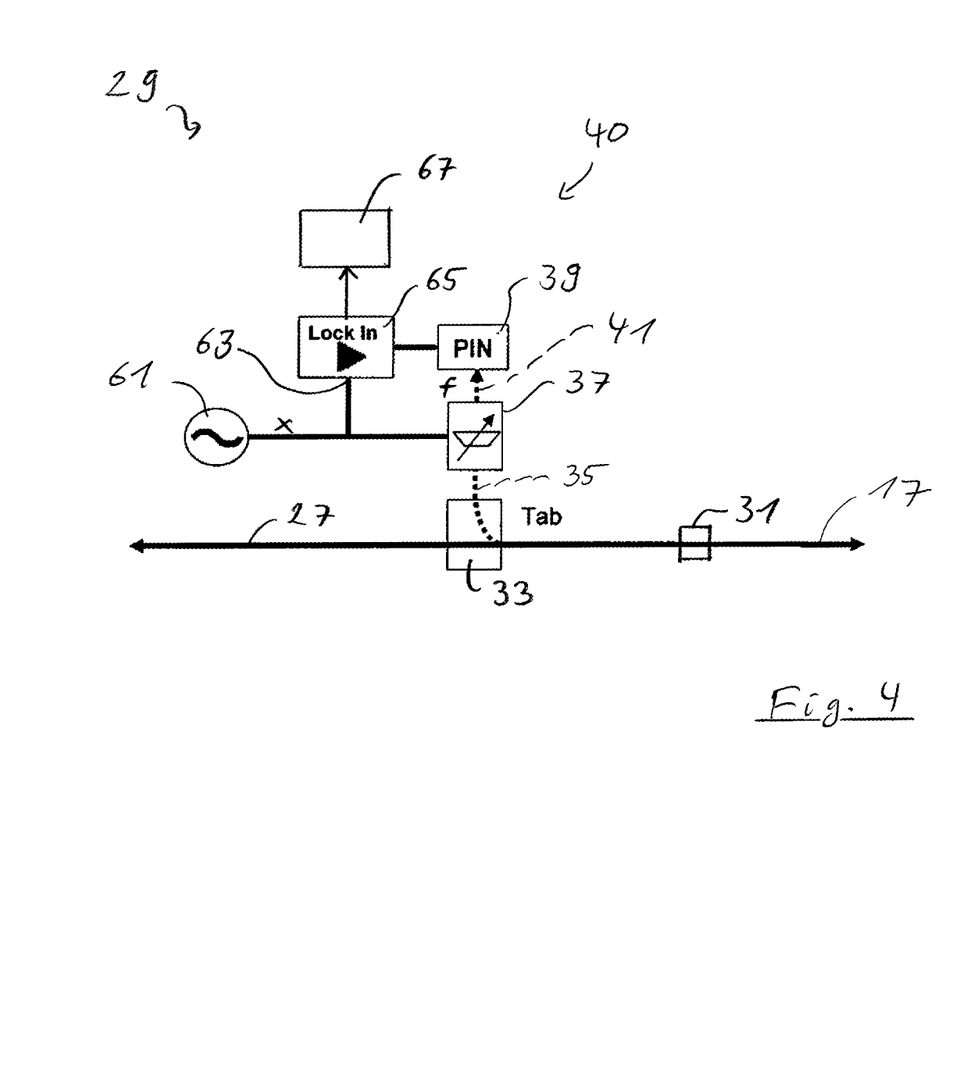
FIG. 4 shows a monitoring node of a communication network according to a second preferred embodiment.

FIG. 4 shows the monitoring arrangement 29 in more detail. The monitoring arrangement 29 comprises an oscillator 61 for generating a control signal x for controlling the band-pass-filter 37 in order to vary the position of the pass band 57 in the wavelength domain. The oscillator 61 is connected to a reference signal input 63 of a lock-in amplifier 65 of the monitoring arrangement 29. The control signal x is therefore a reference signal for the lock-in amplifier 65. An output of the lock-in amplifier 65 is connected to a input of a control element 67 of the monitor arrangement 29.

When operating the monitor arrangement 29 the oscillator 61 generates the control signal x. A frequency 1/T (cf. FIG. 3) of the control signal x may be in the range of several kilohertz, preferably less than 100 kilohertz, preferably less than 20 or 10 kilohertz. Using a rather low frequency 1/T of the control signal x allows for correctly adjusting the pass band 57 of the low-pass-filter 37 that may have mechanical parts to be moved for changing the position of the pass band 57 within the wavelength domain.

The lock-in amplifier 65 allows for detecting the monitoring signal m, i.e., the variations of the amplitude A of the signal f even if a quite large amount of backscatter is present in the optical link 17. The lock-in amplifier 65 indicates to the control element 67 whether it has detected the monitoring signal m or not. According to this indication, the control element 67 determines that the link 17 is defective or not. The control element 67 may signal information about the status of the link 17 to other components of the monitoring node 13 or even other nodes of the network 11.

The lock-in amplifier 65 is not absolutely required. In another embodiment, the lock-in amplifier 65 is omitted and an output of the monitoring receiver 39 is directly connected to the control element 67 so that the control element 67 can detect whether the amplitude of the received signal f varies or not.

Figure 5:
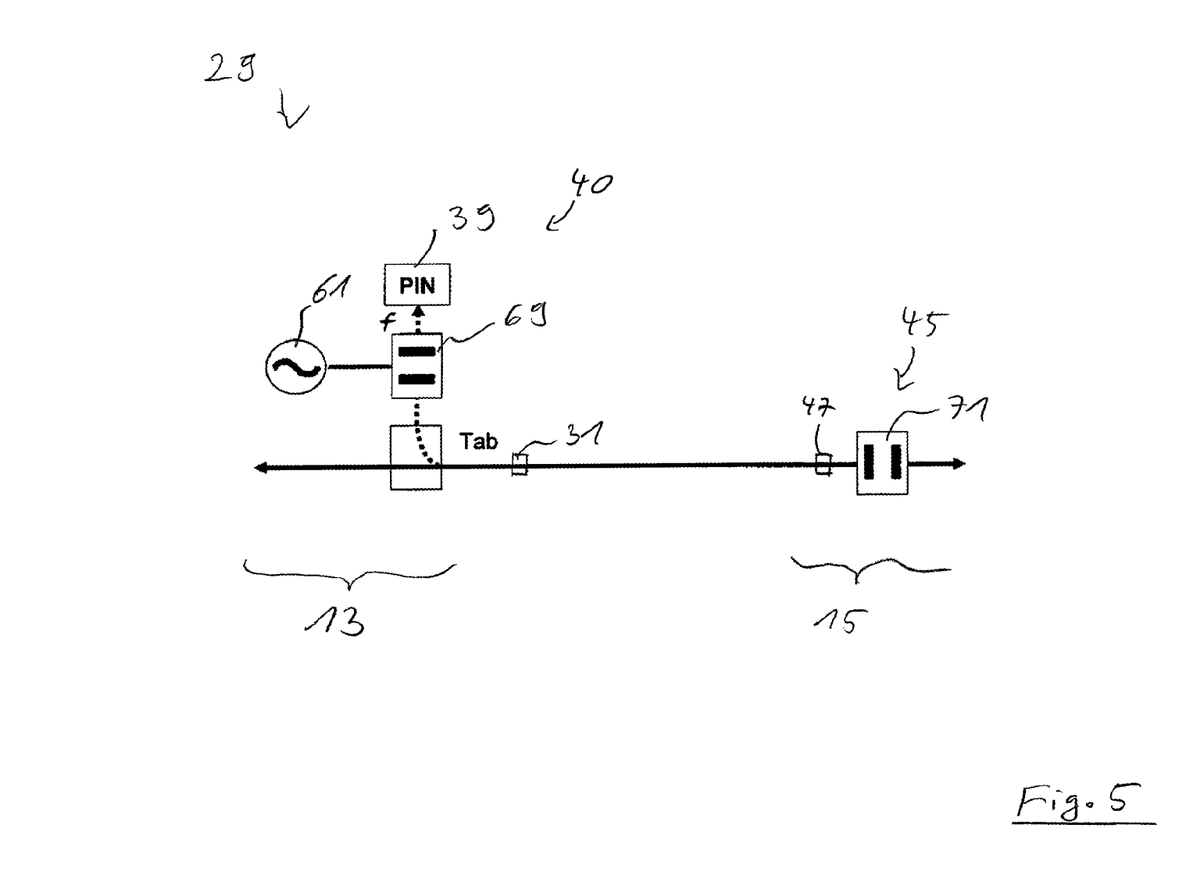
FIG. 5 shows an optical communication network according to a third preferred embodiment.

As shown in FIG. 5, the monitoring arrangement 29 may comprise a tunable periodic filter 69 instead of the band-pass-filter 37. The tunable periodic filter 69 may comprise or consist of a tunable etalon (also referred to as for Fabry-Perot interferometer). The etalon may comprise material a refractive index of which can be influenced by means of a electric voltage applied to the material. In the embodiment shown in FIG. 5 the lock-in amplifier 65 has been omitted. However, in another embodiment the lock-in amplifier 55 is present and connected to an output of the monitoring receiver 39 and the oscillator 61 as shown in FIG. 4.

Furthermore, the reflector 45 comprises a periodic static filter instead of the band-pass filter 37 shown in FIG. 1.

Figure 6:
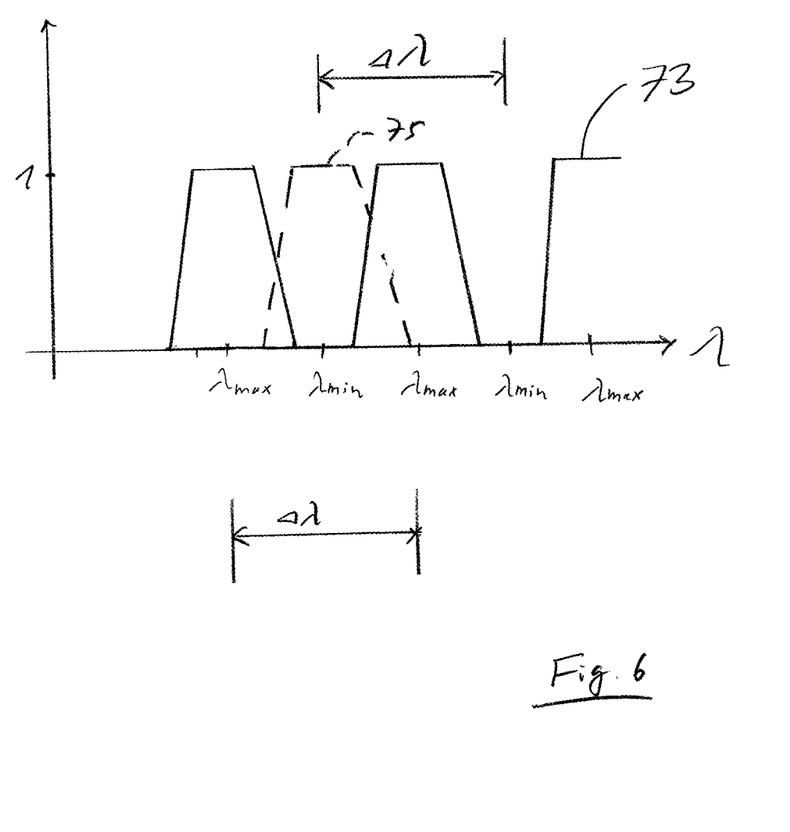
FIG. 6 shows a transfer function and a reflection function of a periodic filter.

FIG. 6 shows a normalized transfer function 73 of the periodic filters 69 and 71. The transfer function 73 is periodic in the wavelength range. Transmission maxima $\lambda_{max}$ and transmission minima $\lambda_{min}$ are equally spaced in the wavelength domain. A spacing $\Delta\lambda$ of the transmission maxima $\lambda_{max}$ and the transmission minima $\lambda_{min}$ may equal to a carrier spacing of adjacent optical carriers of the WDM system. For example, in WDM the carrier spacing may be 20 nm according to ITU-T Recommendation G.694.2. Accordingly, in a preferred embodiment, the spacing $\Delta\lambda$ of transmission maxima $\lambda_{max}$ and transmission minima $\lambda_{min}$ may be 20 nm.

Both the monitoring arrangement 29 as well the reflector 45 can be applied for multiple WDM channels, preferably for all WDM channels, of the WDM system. In other words, the filters 69, 71 need not be adapted to a specific wavelength channel used by the signals $\lambda 1$ and $\lambda 2$.

A reflection function 75 of the periodic filters 69, 71 indicates which wavelength $\lambda$ are reflected by these filters 69, 71. Preferably, transmission minima $\lambda_{min}$ of the static periodic filter 71 correspond to a carrier frequency c1 of the first optical signal $\lambda 1$ or at least reside within the first wavelength range R1 so that the reflected monitoring signal m occupies as the second wavelength range R2 being a proper sub range of the first wavelength range R1.

Figure 7:
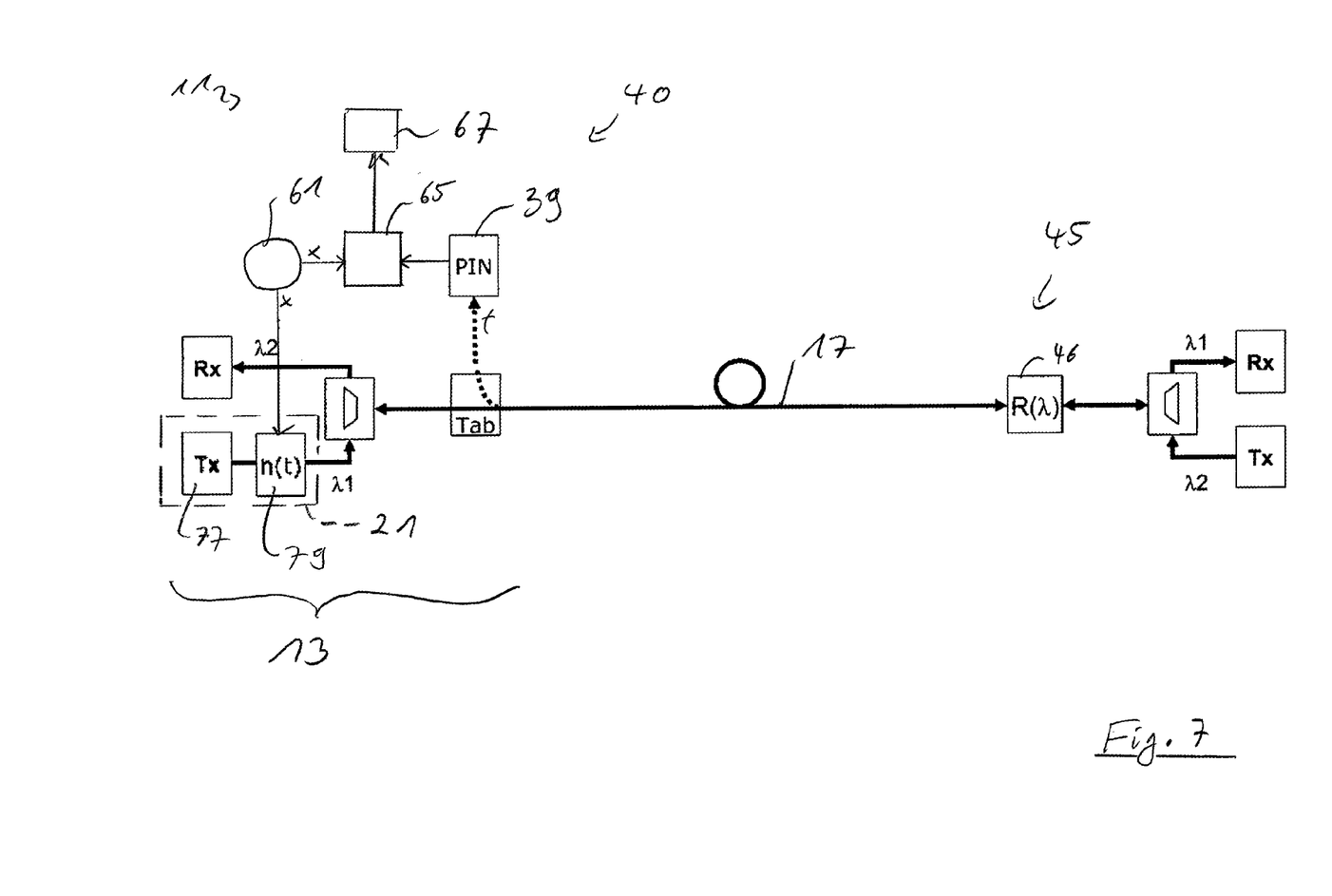
FIG. 7 shows an optical communication network according to a fourth preferred embodiment.

As shown in FIG. 7, a carrier frequency of the first transmitter 21 may be variable. In the schematic diagram of FIG. 7 the first transmitter 21 comprises a transmitter element 77 for transmitting the first optical signal $\lambda 1$ modulated with the first data stream $d_1$ and a frequency modulator 79 for shifting the carrier frequency c1 of the first optical signal $\lambda 1$ in the wavelength domain, i.e., for shifting the first wavelength range R1 in the frequency domain. The output of the oscillator 61 is connected to an input of the modulator 79. The first transmitter 21 may comprise a tunable laser an input of which being connected to the oscillator 61 so that the carrier c1 and the first wavelength range R1 can be shifted by tuning the laser.

When operating the network 11 shown in FIG. 7 the oscillator 61 generates the control signal x and the carrier frequency c1 of the first optical signal $\lambda 1$ is varied continuously and periodically, the frequency of this variations corresponding to the frequency 1/T of the control signal x. Because the strength of the monitoring signal m reflected by the reflector 45 depends on the first wavelength range R1 of the first optical signal $\lambda 1$ continuously shifting the first wavelength range R1 causes the strength of the monitoring signal m to vary in time. As a consequence, the amplitude A of the signal f received by the monitoring receiver 39 varies according to the variation of the carrier frequency although the monitoring node 13 shown in FIG. 7 has no tunable filter 37.

The lock-in amplifier 65 detects whether the variations of the amplitude of the signal f are present or not and indicates this to the control element 67. Depending on the signaling, the control element 67 determines whether the optical link 17 is defective or not.

In another embodiment, the lock-in amplifier 65 is omitted and the output of the monitoring receiver 39 is connected directly to the control element 67.

To sum up, the present invention provides an optical access network 11, a monitoring node 13 and a reflector node 15 that allow for monitoring the link 17 for defects or disruptions without allocating additional transmission resources (wavelength ranges). By using a tunable filter 37, 69 or by using a tunable transmitter 21 the monitoring signal m can be easily and reliably detected even if a large amount of back scatter is present at the monitoring node 13. Furthermore, the monitoring node can differentiate between a failure of the link 17 and a failure of the second transceiver 43.

The invention claimed is:

1. Monitoring node of an optical communication network, the monitoring node comprising:
    a port for outputting at least one optical signal having a first wavelength range over an optical link of the network to a reflector node of the network; and
    a detector coupled with the port for determining whether the link is defective, the detector comprising:
        a tunable filter at an input of the detector;
        an oscillator varying a pass wavelength of the tunable filter; and
        a lock-in amplifier;
    wherein a reference signal input of the lock-in amplifier is connected to an output of the oscillator and the detector is arranged for detecting a monitoring signal generated by the reflector node reflecting a part of the optical signal back into the link, the monitoring signal having a second wavelength range that is a proper sub-range of the first wavelength range.

2. Monitoring node according to claim 1, wherein the detector comprises a monitoring receiver for determining an amplitude of a filtered signal at an input of the monitoring receiver, a tunable filter arranged between the input of the monitoring receiver and the port, and a control element arranged for varying a pass wavelength of the tunable filter while determining the amplitude of the filtered signal and for detecting that the monitoring signal is present if the determined amplitude varies.

3. Monitoring node according to claim 2, wherein the tunable filter is a band-pass filter, preferably a tunable optical grating, said pass wavelength corresponding to a center wavelength of the band-pass filter.

4. Monitoring node according to claim 2, wherein the tunable filter is an optical periodic filter comprising a tunable optical resonator, preferably a tunable etalon, said pass wavelength corresponding to a wavelength of a transmission peak of the resonator.

5. Monitoring node according to claim 1, wherein the monitoring node comprises a transmitter for transmitting the optical signal, said transmitter being arranged for varying a carrier frequency of an optical carrier of the optical signal and wherein the detector comprises a monitoring receiver for determining an amplitude of a signal received at an input of the monitoring receiver and a control element arranged for varying the carrier frequency while determining the amplitude of said received signal and for detecting that the monitoring signal is present if the determined amplitude varies.

6. Monitoring node according to claim 1, wherein the monitoring receiver comprises a photodiode, preferably a PIN photodiode.

* * * * *